Figure 1:
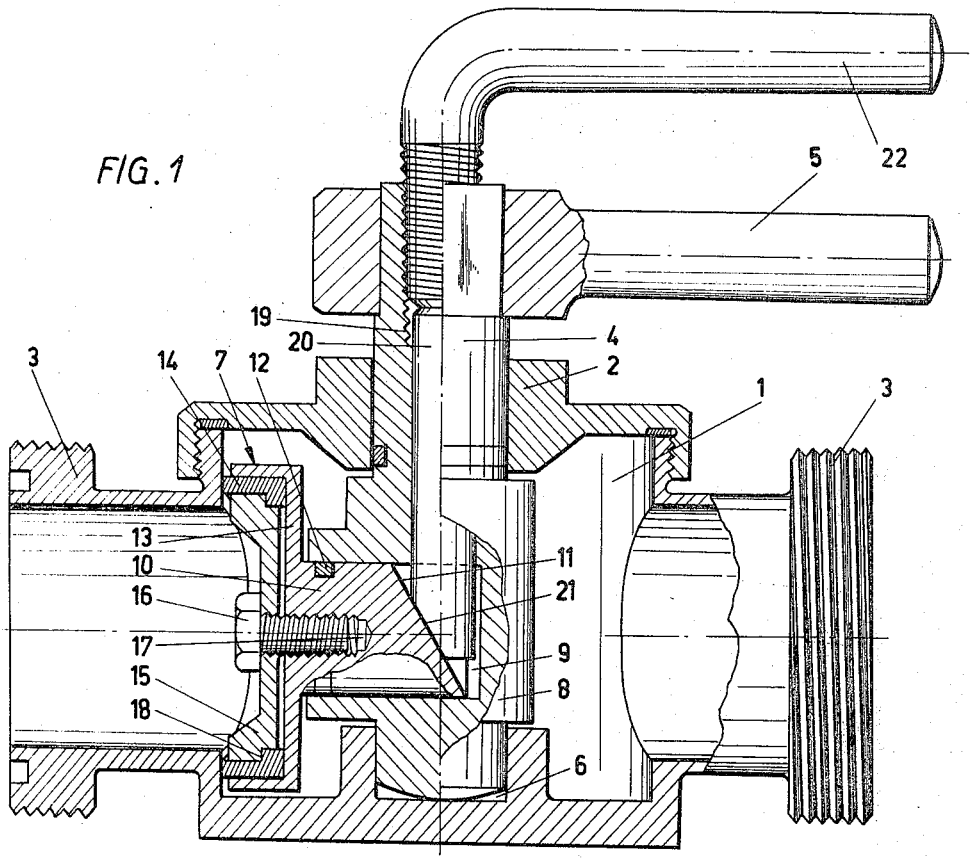

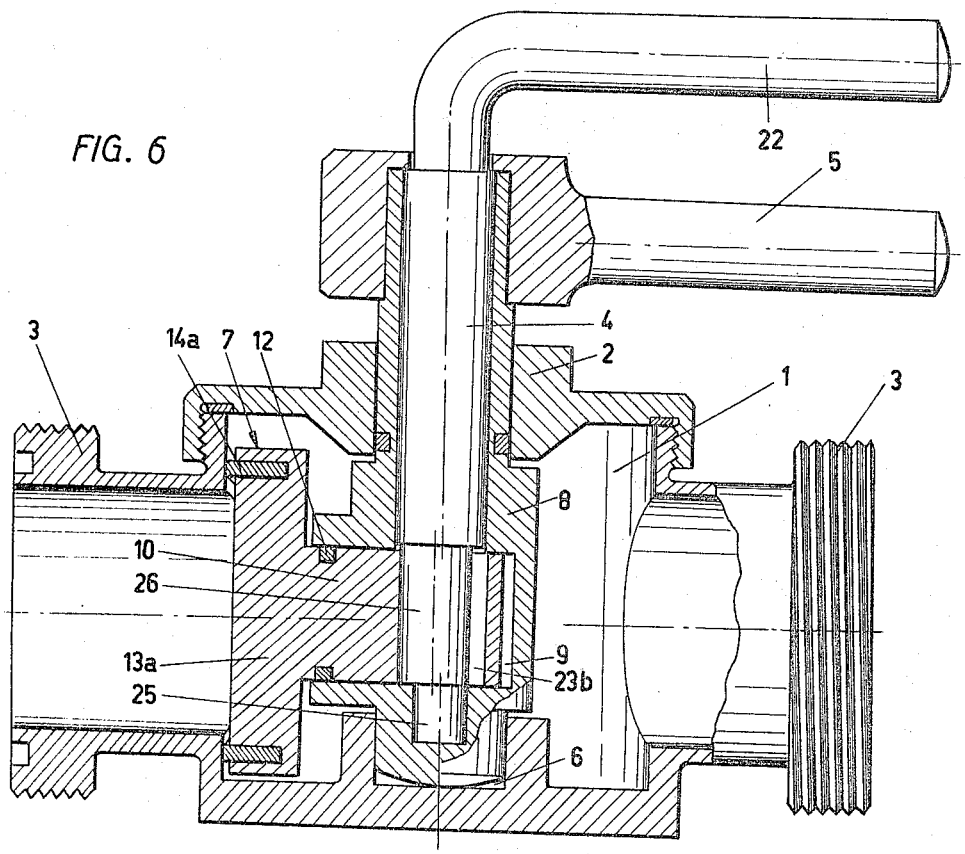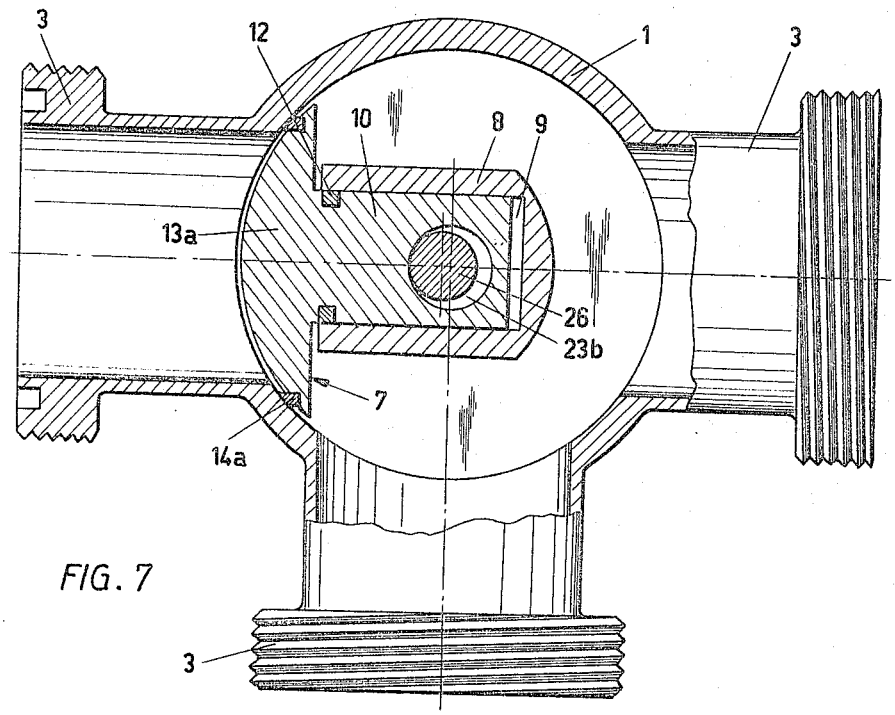

United States Patent Office 3,342,453
Patented Sept. 19, 1967

3,342,453
STOP VALVE
Jouko Viljami Soila and Erkki Pietari Niskanen, Malmi, Helsinki, Finland, assignors to Koltek Oy, Helsinki, Finland
Filed Aug. 12, 1964, Ser. No. 389,035
Claims priority, application Germany, Aug. 19, 1963, N 23,625; Finland, May 26, 1964, 1,133/64
4 Claims. (Cl. 251—184)

This invention relates to a stop valve having a mainly cylindrical valve cavity provided with two or more through-passages, a centrally pivoted, turnable valve rod, a stopping organ which communicates with the valve rod, by aid of which when turning the valve rod any one of the through-passage openings in the valve pocket may be sealed, and means for pressing the stopping organ against the valve seat.

Stop valves of the above type, in which the stopping organ is pressed against the valve seat by an external joint and lever system, are already known. One of the more apparent disadvantages in the above type of valves is, that the joint connections are exposed to wear and breaking, which calls for repeated repairs.

A type of stop valve is also known, in which an excentric catch member is arranged on the valve rod, along with which the stopping organ follows the valve rod while the latter is being turned in one direction for closing any one of the openings in the valve pocket, and, which by turning the rod in the opposite direction the stopping organ may be tightly pressed against the valve seat. However, a valve like this has the disadvantage therein, that while turing the catching organ for pressing the stopping organ against the openings of the valve passage, the stopping organ tends to direct itself toward the side of the valve passage, due to the friction formed between the stopping organ and the cam of the catching organ, in which case there is not obtained an absolute tightness. Moreover, the above valve must have spring- and stop-devices, which will make the construction fairly complicated.

As one very obvious disadvantage in valves of the earlier known types is also the fact, that the valve parts arranged in the valve cavity have many hollows, shoulders and corners, surfaces and the like, into which the liquids passing through the valve can remain and make the valve dirty, so that the same in a very short time of service becomes unfit for use. Furthermore, the disassembly for cleaning and its reassembly is difficult and takes time.

The valves of the aforesaid type also lack devices whereby the stopping organ, which is tightly pressed against the valve seat, could be detached from its contact with the seat.

An object of the present invention is to eliminate the above stated disadvantages and to produce a simplified and reliable type of stop valve, in which the parts in the valve cavity contain a limited number of hollows, corners, surfaces and the like, against which the liquid substance passing through the valve can be trapped.

The above stated object is attained by the valve produced according to this invention, which is mainly characterized in that the stated organs, for pressing the stopping organ against the valve seat and, if need be, also for their detachment, are operative by means of parts arranged in a hollow valve rod.

Other purposes, advantages and details of the invention are clarified in the following description and the accompanying drawings, in which FIGURE 1 shows a side view in partial section through the center of the valve body in an embodiment of a stop valve according to the invention.

Figure 2:
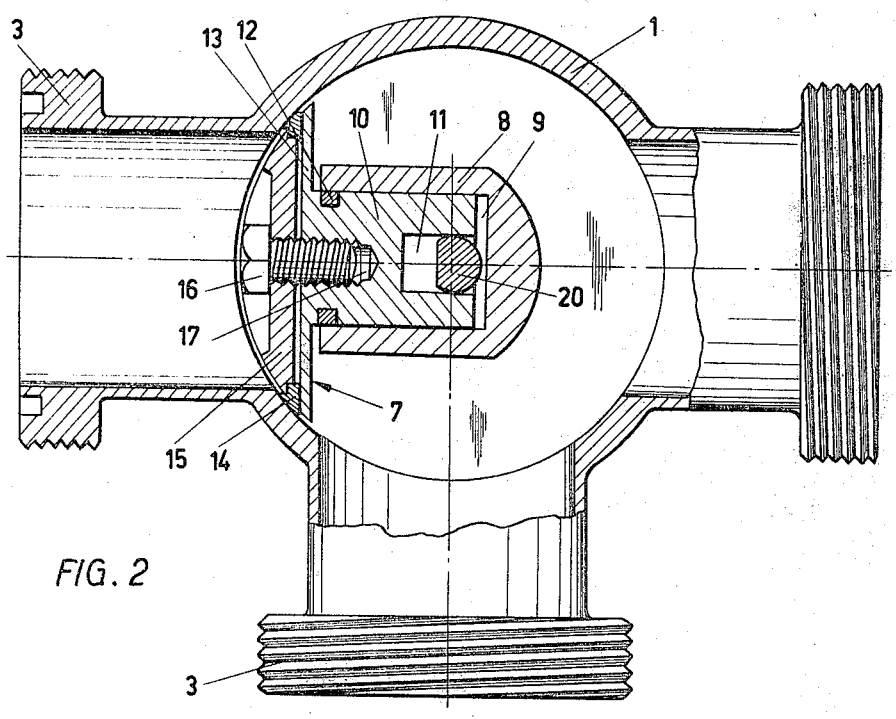
Figure 3:
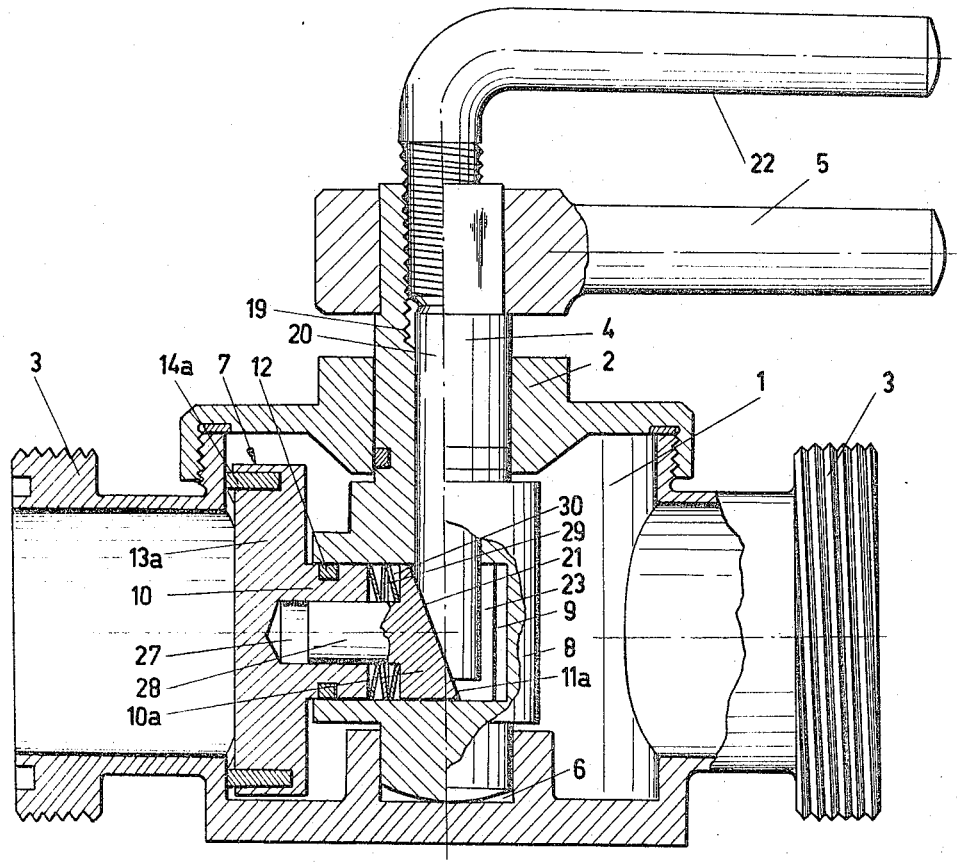
Figure 4:
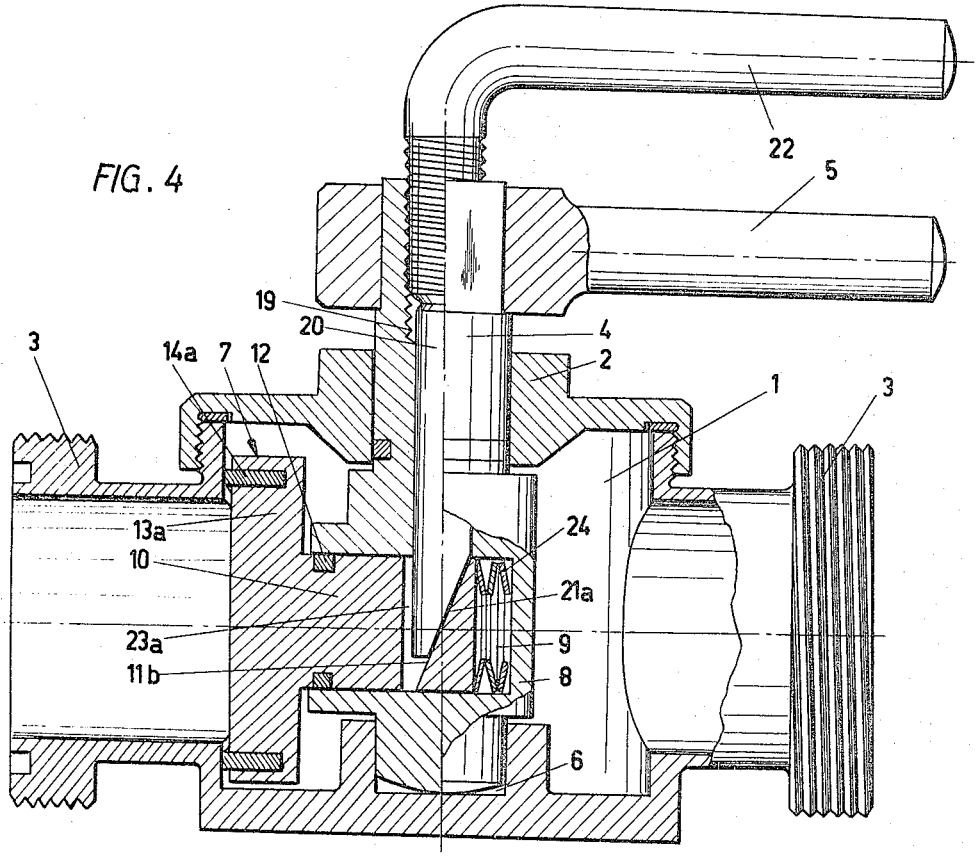
Figure 5:
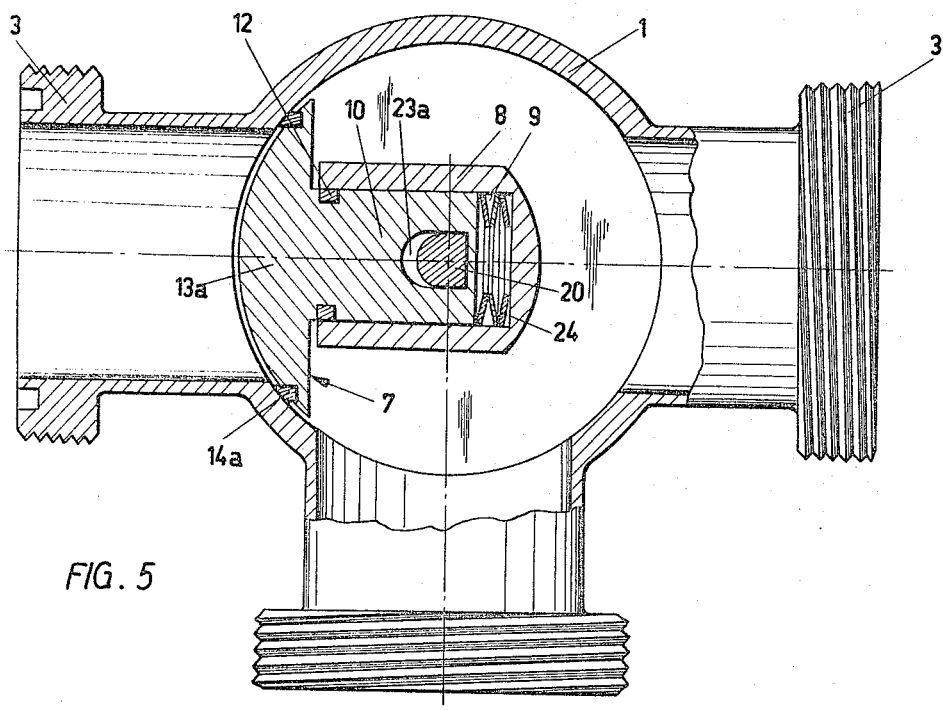

FIGURE 2 shows a top view in partial section through the center of the valve body of a stop valve according to FIGURE 1, FIGURE 3 shows a side view in partial section through the center of the valve body in a second embodiment according to the invention, FIGURE 4 shows in the same way as FIGURE 1 a third embodiment according to the invention, FIGURE 5 shows in the same way as FIGURE 2 the valve according to FIGURE 4, FIGURE 6 shows in the same way as FIGURES 1 and 4 a valve according to a fourth embodiment of the invention and FIGURE 7 shows in the same way as FIGURES 2 and 5 the valve according to FIGURE 6.

In the different figures of the drawings the same parts are designated by the same reference numbers.

In the three-way stop valve according to FIGURES 1 and 2 there are formed three threaded end connection parts 3, extending from the mainly cylindrical valve body 1, which is closed by a screw cap 2, by which means there is formed three passage openings. Through the screw cap 2 is a centrally and tightly led valve rod 4, the external end of which is provided with a turning lever 5, for turning the valve rod, the rounded internal end of which is rotatably mounted in a cylindrical cavity 6 at the bottom part of the valve body. Into the valve body is arranged a valve part or stopping organ 7, which is described more fully in the following:

At the inner end of the valve rod 4 is an expanding part which functions as a supporting and guiding member 8, and which in the referred case has been formed from the same part as the valve rod, but this member may be formed as a separate part and fixed by any suitable means to the valve rod. This supporting member 8 is of substantially U-form having a radial, horizontally bored out cavity 9 with a center line passing through the center of the valve body. It is, of course, natural, that the shape of cavity 9 may be of any suitable form, e.g., a square, rectangular, etc.

Into bore 9 of the supporting member 8 is fitted a sliding member 10 which has an oblique plane 11, slanting from the top downward. Around the sliding member there is fitted a packing ring 12, in order to prevent the liquid material from coming into contact with the guiding surfaces of the sliding member 10. The actual sealing portion of the valve 7 consists of a round cup-like part 13, from which the sliding member 10 centrally extends, a packing ring 14, arranged into the inside edge of part 13, and a fastening plate 15 for the said packing ring, which is secured to the sliding member by a screw 16, screwed into a threaded bore 17 in the center of sliding member 10. The base part of packing ring 14, which rests against the bottom of the cup-like part 13, is thicker, whereby there is formed a shoulder 18, against which the corresponding shoulder on the fastening plate 15 presses itself for securing the packing ring in place. Relative to the shoulder 18 of the packing ring 14, the opposite end of the ring extends slightly over the fastening plate 15 of the cup-like part 13, so that the same may be pressed tightly against the valve seat for closing the opening of the through-passage. The packing ring is preferably made of plastic and the changing of the same for a new one becomes quite easy.

The valve rod 4 is hollowed out by means of a central bore extending to the horizontal bore in the supporting member 8, the external end of which is provided with inner threading 19. Into the said bore is fitted a wedge plug 20, the inner end of which is inclined in such a way that the formed oblique plane 21 will rest against the inclined surface 11 of the sliding member 10 and is in line therewith. The outer end of the wedge plug 20 extends approximately to the lower end of the internal threading 19 of the valve rod 4. At the internal threads 19 on the valve bore is screwed a tightening screw 22 provided with corresponding outer threading, the purpose of which will be described later.

The stop valve according to the invention is operated in the following way.

For sealing the opening of any of the valve passages the guiding member 8 is turned by lever arm 5 so that the stopping organ 7 is placed over the opening in question. Hereafter the lever with screw 22 is turned so that it moves inwards in the bore of valve rod 4 and presses the oblique plane of the wedge plug 20 against the inclining plane 11 of sliding member 10 of the stopping organ 7, so that the stopping organ moves to the left in FIGURES 1 and 2, pressing the packing ring 14 against the valve seat. At this moment the passage opening in question is tightly stopped. To open the passage, the tightening screw 22 is loosened, after which the stopping organ 7 can be turned by lever 5 to another position.

The pressing of the stopping organ against the valve seat can, of course, instead of the tightening screw be carried out by means of lever devices or by using liquid or gas pressure means, in which case a remote control system can be adapted for operation of the valve.

The valve according to FIGURE 3 differs from the valve shown in FIGURES 1 and 2 with regard to the construction of the stopping organ 7, which is described as follows.

The stopping organ 7 comprises a circular frame part 13a, near to the rim of which there is a ring groove for a packing ring 14a. In sliding member 10 there is formed a central bore 27 for a purpose explained later on.

Into the inner end of bore 9 in the supporting and guiding member 8 is arranged a separate cylindrical sliding member 10a, from which a stem part 28 extends into bore 27. Around the stem part 28 is arranged a spring 29, one of its ends resting against the inner end of sliding member 10 and its other end against the shoulder 30 of the sliding member. The sliding member 10a is formed with an inclined surface 11a tapering downwards. A cavity 23 is formed in member 8 and the length of the cavity 23 in the direction of the main axis of the valve body is slightly greater than the diameter of the wedge plug 20, the length of which corresponds to the moving distance of the stopping organ 7. The inner end of the wedge plug, arranged in the hollow valve rod 4, and which reaches to the cavity 23 in the sliding member 10a, has an oblique surface 21, the angle of which is equal to that of surface 11a, so that the surfaces 11a and 21 are resting against another.

A valve according to the above embodiment works in the same way as the valve according to FIGURES 1 and 2, with the exception that the pressing of stopping organ 7 against the valve seat is performed by aid of the sliding member 10a and spring 29 and thus not only by means of the wedge plug 20 as in the former embodiment. By this means there is attained a soft pressure effect against the valve seat. When the wedge plug 20 is lifted upward by turning of the tightening lever arm 22, the spring 29 extends and the stopping organ 7 can be turned, by shifting the lever arm 5, so that it stops at the second opening of the valve.

The valve according to FIGURES 4 and 5 differs from those already described in FIGURES 1 and 2 only in the construction of the stopping organ 7 and its shifting or guiding member 8, and therefore only these constructional differences are here described.

The stopping organ 7 comprises a circular frame part 13a, near to the rim of which there is made a ring groove into which is fitted a packing ring 14a, sliding member 10 extending centrally into the valve body. Close to the inner end of this sliding member is a vertical passage 23a, the width of which is mainly equal to the diameter of the valve rod 4. The passage 23a has a radius of curvature at the end closest to the stopping organ which is equal to the radius of curvature of the wedge plug 20, and the opposite end of which is provided with an inclined plane 11b tapering in the downward direction. The length of cavity 23a in the direction with the main axis of the valve body pocket is somewhat greater than the diameter of the wedge plug 20, the above length corresponding with the moving distance of the stopping organ. Between the inner end of the sliding member 10 of stopping organ 7 and the closed end of the hollow or bored out end 9 there is arranged a spring washer 24, which presses the stopping organ against the valve seat. Alternatively there may be used a helical spring.

The inner end of wedge plug 20, which is placed into the hollowed valve rod 4 and which reaches to the cavity 23a on sliding member 10 of the stopping organ 7, is inclined at the same angle as the inclined plane 11b in such a way that the end of the wedge plug is tapering toward its end.

The valve according to this embodiment operates in the following way.

In order to seal the desired passage opening of the valve, the guiding or supporting member 8 is turned by lever arm 5 so that the stopping organ 7 is placed over the opening in question. The spring 24 now presses the packing ring 14a of stopping organ 7 against the valve seat, as shown in FIGURES 4 and 5. By this means the through-passage is tightly sealed. When this opening is to be subsequently opened, the tightening screw 22 is turned so that it moves inwards in the bore of the valve rod 4 and presses the inclined plane 21a of wedge plug 20 against the inclined plane 11b of the sliding member, in which case the stopping organ 7 moves to the right in FIGURE 4 and the packing ring 14a will lose contact with the seat of the opening in question. After this the stopping organ may be freely moved to cover another passage opening by means of the lever arm 5.

Even in this embodiment the moving of the stopping organ 7 from the valve seat may, instead of using the tightening screw, be carried out by means of lever devices or by using liquid or gas pressure, in which case the valve can be constructed for remote control.

Referring to the FIGURES 6 and 7, only the details of the valve according to this embodiment that differ from the earlier embodiments are here described. The stopping end in the sthopping organ 7 is similar to the one illustrated by FIGURES 5 and 6, with the exception that close to the inner end of the sliding member 10 there is formed a vertical bore 23b, which in its horizontal section is circular.

In the bore of the hollow valve rod 4 is a round bar 26, which is turnable by a tightening arm 22. A thinner, central lower end 25 of said round bar is rotatable in a cavity made in the lower end of valve rod 4. The part of bar 26, which is situated at the bore 23b of sliding member 10, is eccentric, the purpose of which is more fully explained later.

The valve according to this embodiment operates as follows:

In order to seal any of the through-passage openings, the stopping organ 7 is turned so that it closes the opening in question by means of valve rod 4 and the lever arm 5. Hereafter the tightening arm 22b is turned so that the eccentric bar 26 shifts the stopping organ 7 to the left according to FIGURES 6 and 7 presses the ring 14a tightly against the seat of the valve. By this procedure the through-passage opening in question will be tightly sealed. When it is desired to open the valve and close any one of the other openings, the tightening arm 22 has to be turned in the opposite direction relative the first mentioned one, whereat the eccentric 26 is set free from its contact with the left hand wall of the bore 23b in the sliding member 10 of stopping organ 7 (FIGS.

6 and 7), thus releasing the pressure between the packing ring 14 and the valve seat. Hereafter the stopping organ can by turning arm 5 be positioned at the desired passage opening.

The invention is naturally not limited only to the here above given examples of embodiments, but it can as to its details vary quite considerably within the scope and limits of the claims.

We claim:

1. A stop valve comprising a valve housing with at least two through passages, a central valve rod pivotally mounted in the valve housing, said valve rod having a cavity therein, a stopping organ slidably mounted in the valve housing for radial movement for closing a selected one of the through passages, said stopping organ including a portion slidably mounted in said cavity of the valve rod, a wedge pin mounted coaxially in the valve rod for axial adjustment therein, said wedge pin having a lower end with an inclined surface exposed in said cavity of the valve rod, a separate member slidably mounted in said cavity, the latter said separate member having a surface with an inclination corresponding to that of the wedge pin and in contact therewith, and elastic means in said cavity between the stopping organ and said separate member urging said stopping organ radially outwards and the separate member against the wedge pin whereby the magnitude of the force of the elastic means acting on the stopping organ is adjustable by displacement of the wedge pin in the valve rod.

2. A valve as claimed in claim 1 wherein said portion of the stopping organ mounted in the cavity of the valve rod has a bore therein extending radially relative to the valve rod, said separate member including a stem slidably mounted in said bore.

3. A valve as claimed in claim 2 wherein said elastic means is a spring encircling said stem.

4. A valve as claimed in claim 3 wherein said portion of the stopping organ is sealingly mounted in the cavity in the valve rod.

References Cited

UNITED STATES PATENTS

| 1,927,855 | 9/1933 | Swanson | 251—163 |
| 2,299,341 | 10/1942 | Ohls | 251—161 |
| 2,919,885 | 1/1960 | Daigle | 251—163 X |
| 3,180,362 | 4/1965 | Muller | 251—163 X |

FOREIGN PATENTS

| 26,205 | 1/1909 | Sweden. |

WILLIAM F. O'DEA, *Primary Examiner.*

H. W. WEAKLEY, *Assistant Examiner.*